United States Patent
Herd et al.

[19]

[11] Patent Number: 5,823,711
[45] Date of Patent: Oct. 20, 1998

[54] WATER DRAINAGE AND COLLECTION SYSTEM AND METHOD OF CONSTRUCTION THEREOF

[75] Inventors: Ian M. Herd; Gary Herd, both of Toronto, Canada; Laird C. Jenkins; James E. A. Maxwell, both of Pinehurst, N.C.

[73] Assignee: Environmental Golf System U.S.A., Inc., Pinehurst, N.C.

[21] Appl. No.: 548,317

[22] Filed: Nov. 1, 1995

[51] Int. Cl.⁶ ..................................................... E02B 13/00
[52] U.S. Cl. ........................ 405/36; 47/DIG. 13; 405/43; 405/45
[58] Field of Search ................................. 405/36, 37, 43, 405/45, 16, 118, 124, 125; 47/DIG. 10, DIG. 13

[56] References Cited

U.S. PATENT DOCUMENTS

| | | |
|---|---|---|
| 3,568,453 | 3/1971 | Ziegenmeyer . |
| 3,705,851 | 12/1972 | Brauer . |
| 4,023,506 | 5/1977 | Robey .................................... 405/43 X |
| 4,359,297 | 11/1982 | Butler . |
| 4,820,080 | 4/1989 | Varkonyi et al. . |
| 4,824,287 | 4/1989 | Tracy ......................................... 405/36 |
| 4,832,526 | 5/1989 | Funkhouser ........................... 405/45 X |
| 4,842,774 | 6/1989 | Golden . |
| 4,844,840 | 7/1989 | Feizollahi . |
| 4,908,129 | 3/1990 | Finsterwalder et al. . |
| 4,955,983 | 9/1990 | Meess et al. . |
| 5,014,462 | 5/1991 | Malmgren et al. ................. 47/DIG. 10 |
| 5,020,936 | 6/1991 | Malmgren et al. ................. 47/DIG. 13 |
| 5,100,258 | 3/1992 | VanWagoner . |
| 5,215,409 | 6/1993 | Jax et al. . |
| 5,366,323 | 11/1994 | Nicholson ........................... 405/118 X |

FOREIGN PATENT DOCUMENTS

| | | |
|---|---|---|
| 2074139 | 1/1994 | Canada . |
| 38 09 128 A1 | 10/1989 | Germany . |

*Primary Examiner*—Dennis L. Taylor
*Attorney, Agent, or Firm*—Bradford E. Kile; Karan Singh

[57] ABSTRACT

A water drainage and collection system and method of construction thereof is disclosed. The system includes a graded channel and a water impervious liner secured within the channel along the channel's wall surfaces. A plurality of scrap tire components are positioned within the channel and on top of the liner. The system includes a drainage reservoir formed at a low point in the channel. The surface water percolates through and around the scrap tire components, runs down the grades of the liner, and collects within the reservoir. A pumping station(s) cooperates with an irrigation system to recycle the water and chemicals back to the surface of the golf course or the like. The result of the system being the collection, storage, and recirculation of water and chemicals used to maintain the field area.

14 Claims, 7 Drawing Sheets

WATER DRAINAGE AND COLLECTION SYSTEM AND METHOD OF CONSTRUCTION THEREOF

BACKGROUND OF THE INVENTION

This invention relates to a novel water drainage and reflection system and method of construction thereof. More specifically, this invention is directed to a novel system comprising a plurality of scrap tire components and a water impervious liner for collecting and recycling irrigation and precipitation water and controlling environmentally hazardous chemicals. The system of the present invention concomitantly provides a valuable and environmentally safe technique for scrap tire disposal.

Tire Disposal

Every year in the United States there are 250 million scrap tires generated. Moreover, there are currently over four billion scrap tires located in illegal dump sites across the United States. It is without question that the existence of these scrap tires create environmental hazards and concerns. The potential for severe fire and/or smoldering of scrap tire stock piles exists across the United States. State and local landfills have become burdened by the large landfill resources required to dispose of used tires. In fact, most local and state authorities charge tire merchants a disposal fee of one to two dollars per tire standard automobile tire. Of course, this cost is normally passed on to the consuming public.

Due to the cost and burdens associated with safely disposing of used tires, many states pay private contractors up to one dollar per tire to safety dispose of tires. The potential economic benefit gained from properly disposing of used tires has lead many to attempt to solve the disposal problems noted above.

A common technique for disposing of whole tires is to shred the tires into discrete pieces and dumping the scraps into landfills. Although this decreases the overall landfill volume required for disposal and prevents tires from floating, it does not address other problems associated with tire disposal. First, the tires still present fire and/or contamination problems discussed above. Second, the process of shredding adds significant cost to the disposal process without any associated cost benefit. Moreover, tire shredding does not offer an alternative productive use for scrap tires and continue to present many landfill problems.

Recycling scrap tires into other commercially useful products offers another disposal alternative. Tires are often used to make other petroleum based products such as floor mats. However, because of the problems attributed to recycling, such as cost and lack of potential use, less than 7% of scrap tires are recycled in this manner. Accordingly, tire recycling has not proven to be a viable tire disposal alternative.

Attempts have been made to utilize scrap tires as an energy source. Specifically, furnaces have been developed to burn scrap tires in the creation of heat energy. This disposal technique has also proven of limited value. First, high capital cost associated with the development and construction of furnaces has curtailed their widespread use. Moreover, other environmental concerns are associated with the burning of tires.

Although significant attention has been devoted to scrap tire disposal techniques in the past, all have limitations and none have proven successful in providing a cost effective method for disposing scrap tires, on a large scale basis, while providing a useful function for the scrap tires.

Water Drainage Systems

In the construction of any large scale facility, such as a golf course or farm field, it is necessary to install a subsurface drainage system that directs and/or collects irrigation and precipitation water. Golf course maintenance requires a great deal of water and chemicals in order to maintain the high playing conditions that today's golfers have come to expect. It is estimated that 650,000 gallons of water are consumed daily on an 18 hole course and that 50,000 pounds of active ingredients (e.g. herbicides, fungicides and insecticides) are required annually per course in the United States. Moreover, the potential runoff of fertilizers and chemicals, especially pesticides, into groundwater or other environmentally sensitive areas has come under attack by individuals and environmental groups. There is a need in the industry for an environmentally conscious golf course design that conserves water and prevents hazardous chemicals from entering ground water.

The construction of conventional drainage systems in large scale facilities first requires the formation of drainage trenches that slope downward toward a central reservoir. A plurality of porous or perforated pipes, such as PVC, are positioned within the trenches. Gravel or crushed rock is placed over and around the pipe to relieve hydrostatic pressure and to direct the ground water toward the perforated pipe. A filter fabric is placed on top of the gravel to prevent soil from mixing with the gravel and clogging paths to the perforated pipe. Back fill is then placed on top of the filter fabric.

Although effective in some applications, these prior art systems fail to address the problems associated with other large scale applications such as golf courses or farms fields. First, because these systems are open systems, hazardous chemical contaminates can potentially runoff into clean water supplies. Second, these prior art systems have failed to provide efficient water containment and recycling capabilities. Moreover, the design and implementation of drainage systems of the prior art utilize costly sub-grade fill. In using conventional water containment media (e.g. gravel, crushed rock, etc.), the systems of the prior art have also failed to recognize the benefits associated with using other media, particularly scrap tires.

Another prior art system comprises using blocks or bales of shredded tires about subterranean structures such as building foundations. This system does not address problems associated with large drainage systems for golf courses, farm fields, or the like. For example, the system provides no means for containing water within the system to prevent runoff and the recycling of hazardous chemicals. Moreover, this prior art disclosure fails to recognize the benefits associated with using baled tires as an integral part of the sub-grade fill.

The difficulties and limitations suggested in the preceding are not intended to be exhaustive, but rather are among many which demonstrate that although significant attention has been devoted to water drainage systems, such systems and processes appearing in the past will admit to worthwhile improvement.

OBJECTS AND BRIEF SUMMARY OF THE INVENTION

It is therefore a general object of the invention to provide a novel water drainage and collection system which will obviate or minimize difficulties of the type previously described.

It is a specific object of the invention to provide a novel water drainage and collection system that provides a means for an environmentally safe and large scale underground utilization of scrap tires.

It is another specific object of the invention to provide a novel water drainage and collection system that is capable of storing large quantities of water to be used for future irrigation purposes.

It is still another specific object of the invention to provide a novel water drainage and collection system that prevents runoff of environmentally harmful chemicals (e.g. herbicides, pesticides, fertilizers, etc.) into adjacent ground water.

It is yet another specific object of the invention to provide a novel water drainage and collection system that incorporates tire bales that not only serve to percolate and retain water, but also provide a cost effective source of sub-grade fill and facilitate landscape design.

It is yet still another specific object of the invention to provide a novel water drainage and collection system that reduces sub-grade and aggregates cost, field grassing and maintenance cost, and fertilizer and herbicides cost.

It is another specific object of the invention to provide a novel method of constructing a water drainage and collection system that incorporates scrap tires.

BRIEF SUMMARY OF A PREFERRED EMBODIMENT OF THE INVENTION

A preferred embodiment of the invention which is intended to accomplish the foregoing includes a system comprising a graded channel and a water impervious liner secured within the channel along the channel's wall surfaces. A plurality of scrap tire bales are stacked within the channel and on top of the liner. The system includes a drainage reservoir formed at low point in the channel. The surface water percolates through and around the tire bales, runs down the grades of the liner, and collects within the reservoir. A pumping station(s) cooperates with an irrigation system to recycle the water and chemicals back to the surface of a golf course or the like. The result of the system being the collection, storage, and recirculation of water and chemicals used to maintain the field area.

DRAWINGS

Other objects and advantages of the present invention will become apparent from the following detailed description of a preferred embodiment thereof taken in conjunction with the accompanying drawings, wherein.

DETAILED DESCRIPTION

Figure 1:
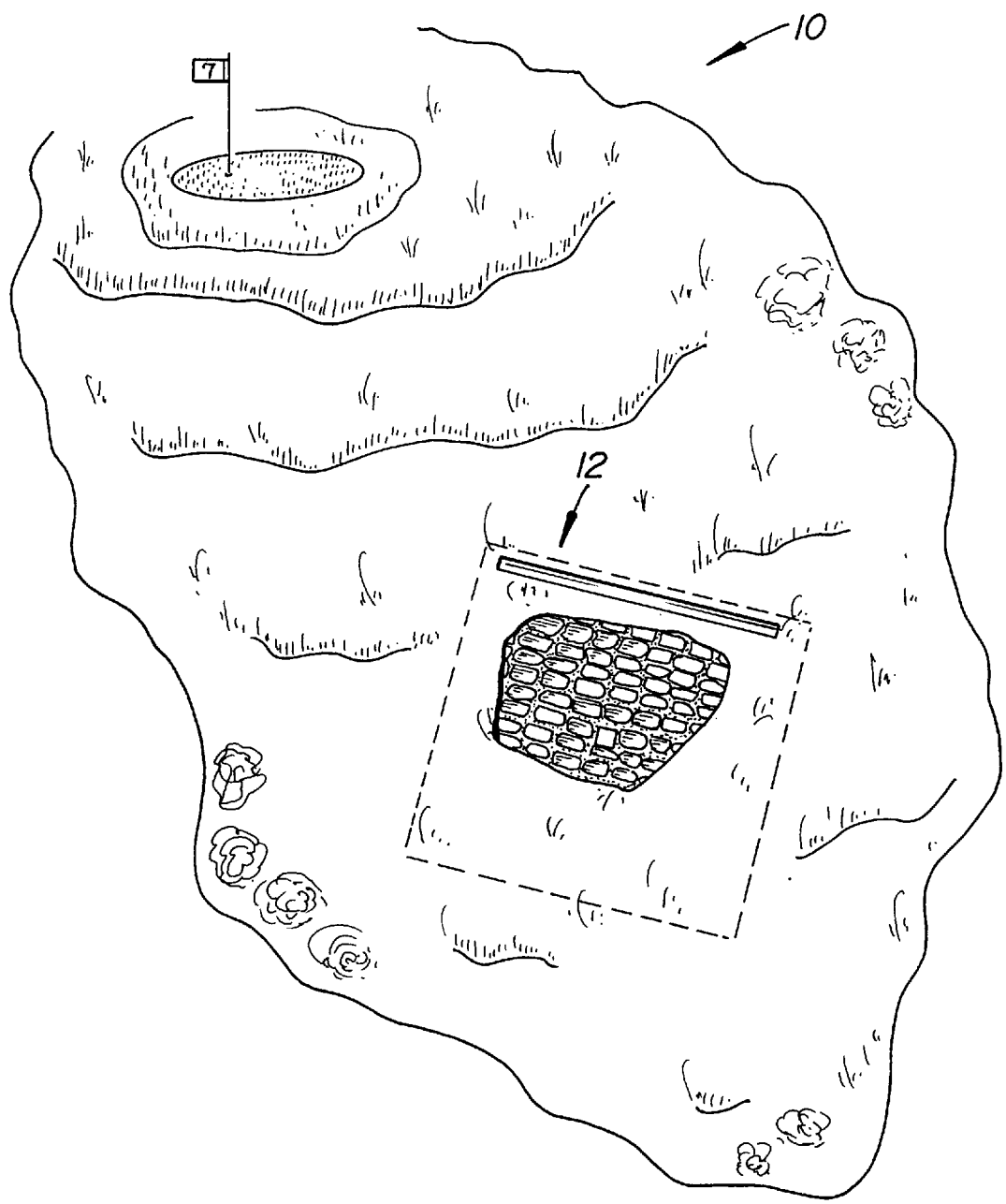
FIG. 1 is a schematic of a golf course having a water drainage and collection system of the present invention.

Referring now to FIG. 1, there is shown a golf course 10 employing the novel subsurface water drainage and collection system 12 of the present invention. In the design and construction of golf courses, recreational fields (e.g. baseball, football, etc.), parks, commercial nurseries, farming applications, or the like it is imperative to provide a water drainage system that will guide water away from certain areas of the facility. For example, in golf courses, it is impermissible to have rain or irrigation water collect and pool in the fairway of the course. The novel system of the present invention insures proper drainage and water collection to maintain a golf course or the like free from undesirable water pooling. The system also provides a recycled source of water and chemicals to support the golf course or the like while at the same time providing the novel benefits of disposing of used tires and avoiding harmful chemical runoff.

Figure 2:
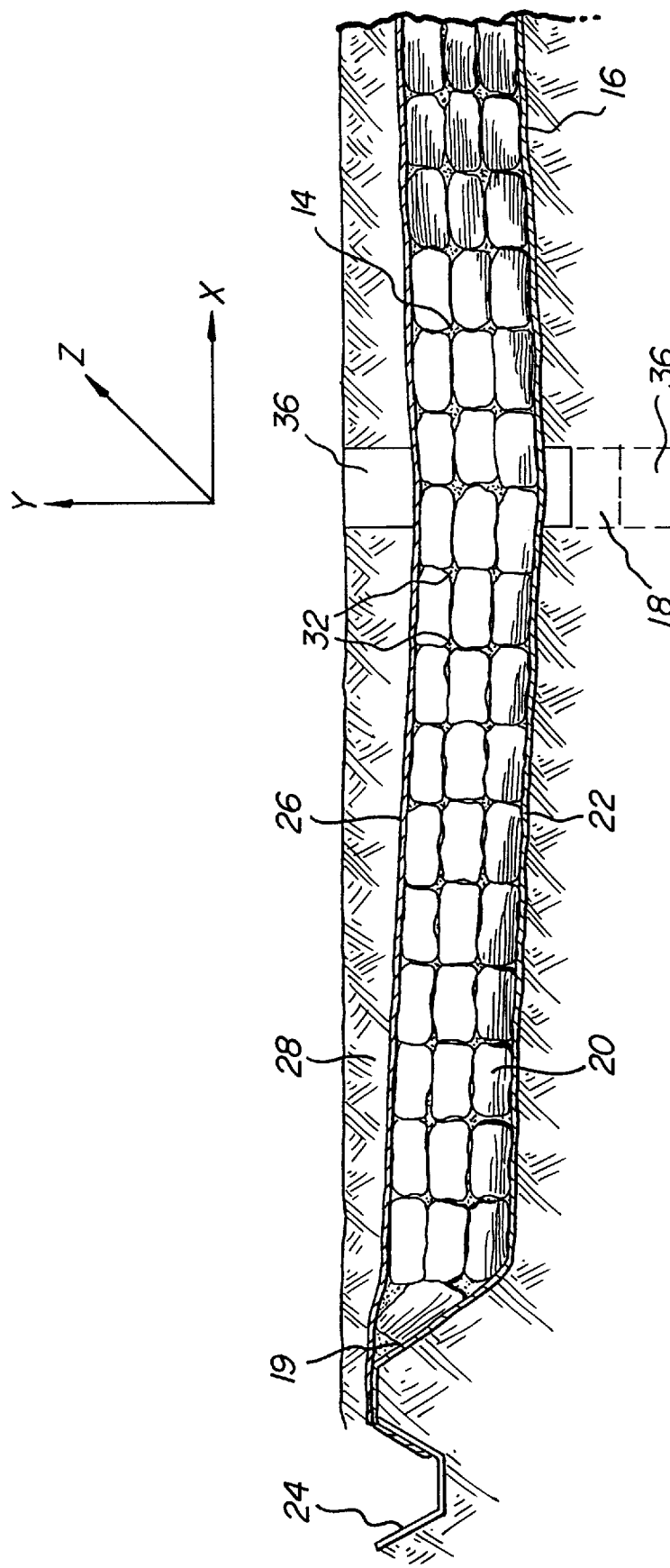
FIG. 2 is a side view schematic of the water drainage and collection system of the present invention.
Figure 3:
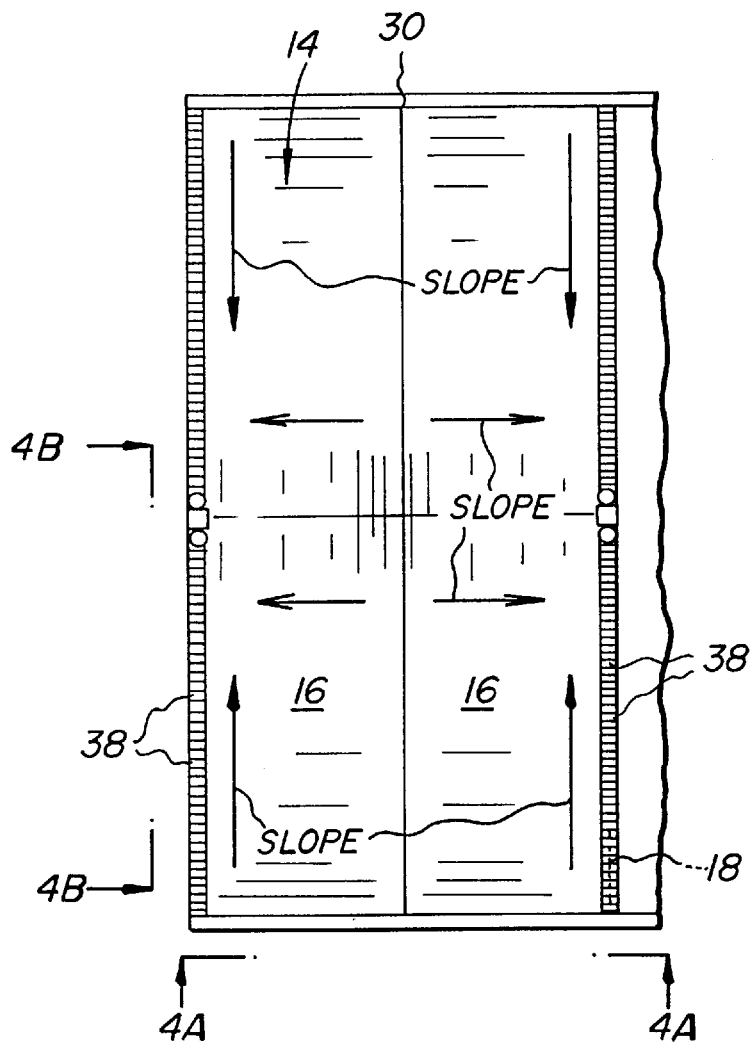
FIG. 3 is a plan view of a graded channel of the water drainage and collection system of the present invention.

Referring to FIG. 2, there is shown an embodiment of the system 12 of the present invention. The system may also be described with reference to FIGS. 4a and 4b that for simplicity only show one layer of tire bales 20 as described below. The system is preferably installed in a pit or channel 14 formed by earth excavation. Alternatively, however, the system may be a raised surface system with an above ground channel (note FIG. 8). The size and configuration of the channel 14 depends on the application of the system. In the golf course application, the channel 14 is excavated so as to lie beneath a fairway or driving range. Alternatively, the channel may comprise a moat formed about the perimeter of the fairway. Channels of large sizes (e.g. greater than 1 acre) are preferably constructed with a series of high and low ridges to control drainage. The channel has a bottom 16 having a grade along the x-axis and the z-axis (note FIGS. 2, 3, and 4a–4b). The grade will depend on the specific application and channel 14 construction, but it is preferably in the order of 1% to 2% along the x-axis and approximately 3% along the z-axis. For example, the bottom 16 of the channel 14 may me configured with a 12 inch drop over a 100 foot length along the x-axis. As shown in FIG. 3, the channel 14 is configured with a central high ridge 30 and a sloping bottom 16. As part of the water collection means, a collection culvert 38 is provided leading to a pumping station 36 as described below. At least one collection reservoir or trench 18 is provided at a low point of the channel 14 in association with a pumping station 36 as hereinafter described.

The system of the present invention also includes an impervious liner 22 to retain rainwater and injected water within the system. The liner 22 isolates the water in the system from surrounding ground water. The liner 22 may be fabricated from a variety of materials suitable for the intended purpose. For example, commercially available 40 mil PVC or Polyflex Geomebrane liners. Depending on the size of the system, the liner would most likely be a plurality of individual commercially available liners attached along a seam by an adhesive or the like. Other suitable liner materials include polyurethane, vinyl or other plastic membranes, or rubber membranes. The liner could also comprise a layer of clay or concrete, although the expense would most likely be far greater using these materials than the above preferred materials. In any event, the selection of materials and the method of constructing the liner will depend upon local conditions, the size of the system, the weight and stresses to be placed on the system, the need to adapt the system for future expansion, the availability and cost of materials as well as other factors.

The liner 22 is placed along the bottom 16 of the channel 14, including the reservoir 18, as shown in FIG. 2. The liner 22 is anchored in position with the use of anchor trenches 24. The end of the liner 22 is placed against the sloping side wall 19 of the channel 14 and wrapped around into an adjacent trench 24 that is formed about the perimeter of the channel 14. The anchor trench 24 is then back filled to hold the liner 22 in place.

In the preferred embodiment, each of the tire bales 20 is formed from 90–105 whole tires. In a conventional bale machine, 100 tires, for example, are inserted and compressed into an approximately 2.5×4×5 foot bale or about 2.3 cubic yards each. At least one binding strap, preferably metallic, is wrapped around the bale to form a distinct block for use in the system of the invention. On average, a 100 tire bale is about 95% material and 5% void to enable the bales to hold water as hereinafter described. If more water storage is desired in the system, fewer tires should be used per bale (e.g. 50 tires per bale) in order to increase the percentage of void space for water storage. The size of the bales and the number of tires per bale are dependent on the site of the system and the particular application.

Figure 6:
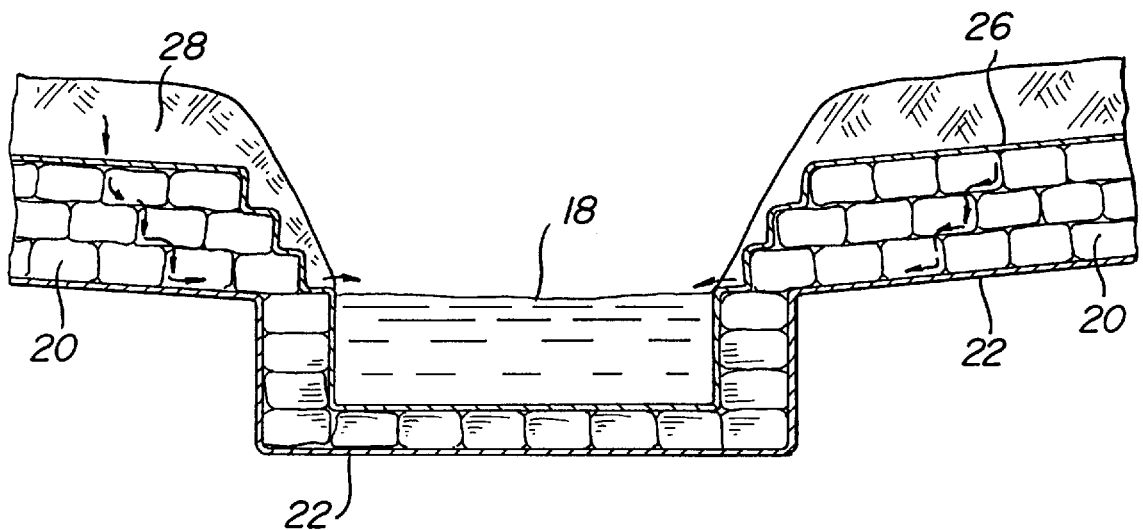
FIG. 6 is a side view showing a water containment reservoir of the water drainage and collection system of the present invention.
Figure 8:
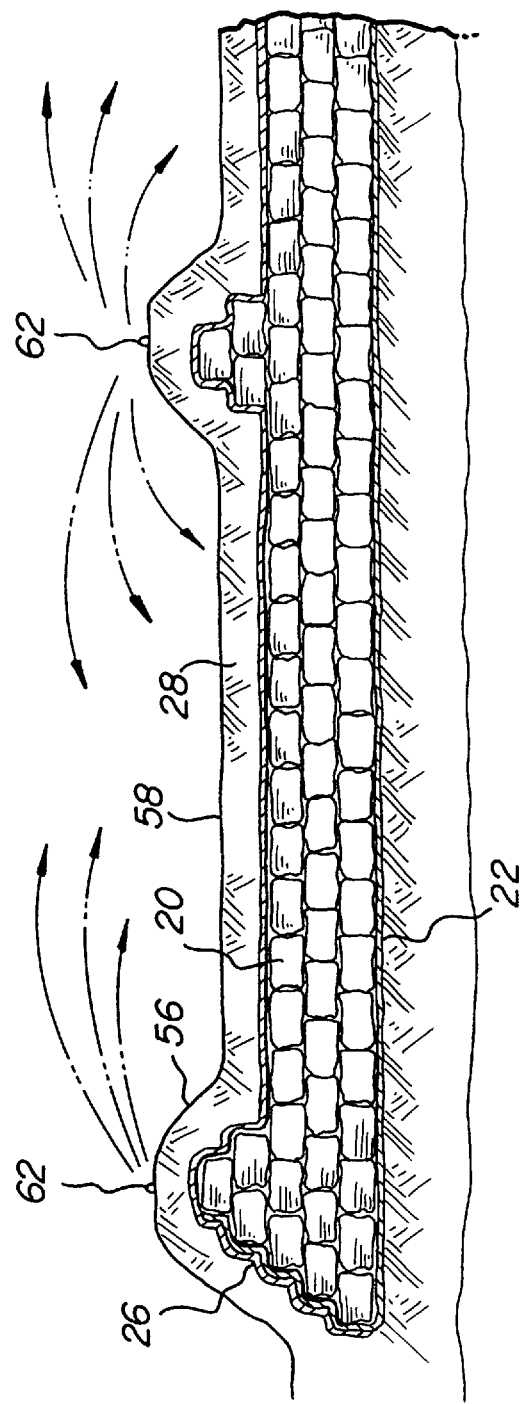
FIG. 8 shows the water drainage and collection system of the present invention as embodied in a farm field.

The bales 20 are placed within the channel on top of the liner 22 to form one or more series of rectangular rows and columns across the surface of the liner 22. The bales may also be placed in a staggered fashion to facilitate landscape design and increase stability as shown in FIGS. 6 and 8. As shown in FIG. 1, the bales are preferably stacked three high, one on top of another, throughout the entire channel 14. The particular number of bales in a stack depends on the size of the channel 14 and the availability of tires. If an extensive source of tires is available, the stack can be as high as permitted by the cost associated with earth removal. Moreover, if more water storage is required, more bales should be provided for each stack. Still further, if a source of earth is required to construct burms or other landscaping, a higher stack may be used resulting in additional excavated earth. In an alternative embodiment, the system of the present invention could use shredded tire as opposed to baled tire or a combination of shredded tire and baled tire. Using shredded tire requires placing whole tires in a shredding machine to form smaller pieces of tire as known in the art. The shredded tire is then placed within the channel 14 and compacted. Shredded tire is not the preferred embodiment because exposed steel from the shredded tire increases iron-oxide content in the water which may require a separate filter system or settling pond. However, if a source of shredded tire is readily available, the advantageous of the present invention may be achieved by using shredded tire.

Once the bales 20 (or a layer of bales 20) have been properly positioned within the channel 14, fill material 32 is preferably placed within the channel over the tire bales 20 and in any gaps present between adjacent tire bales. Ideally, the fill material 32 consist of shredded tire, thereby increasing the capacity to dispose of used tires in the system. Alternatively, stone or gravel may be used as fill material 32.

A water pervious membrane 26 is positioned over the stacks of bales 20. The water pervious membrane 26 will cover the bales 20 to permit water to filter through the bales 20 on the one hand, but prevent the soil cover 28 from entering the system on the other hand. The membrane 26 may be constructed from any material suitable for this purpose. For example, it may be fabricated from nylon, fiberglass, burlap or the like known in the art. A layer of earth or soil 28 is placed over the water pervious membrane 26. The soil layer 28 should be at least 18 inches in depth to permit vegetation growth (e.g. grass, shrubs, etc.) and support the irrigation system (e.g. piping and sprinklers), but may vary depending upon the surface crop and other engineering considerations.

Figure 4A:
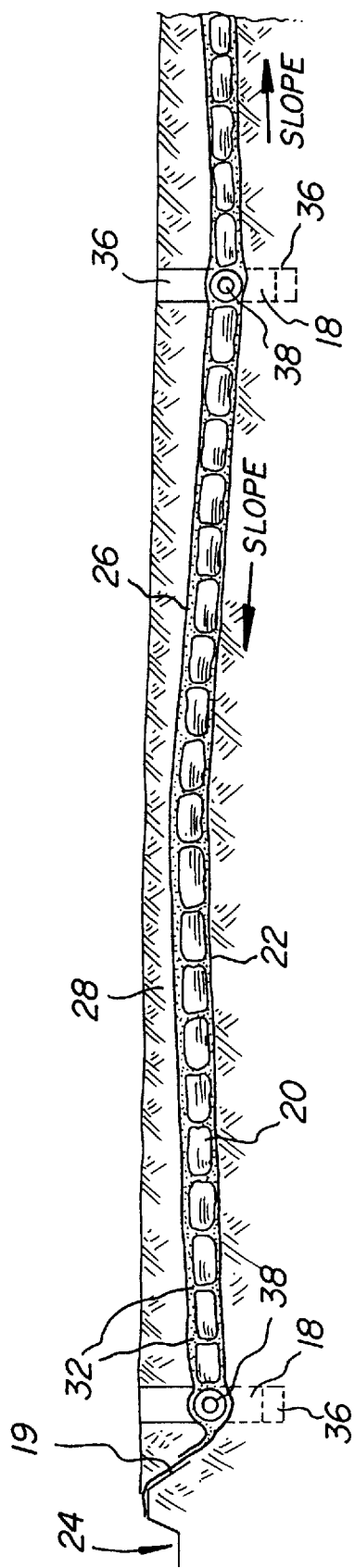
FIG. 4a is a view taken along line 4a–4a of FIG. 3 showing the primary components of the water drainage and collection system of the present invention.
Figure 4B:
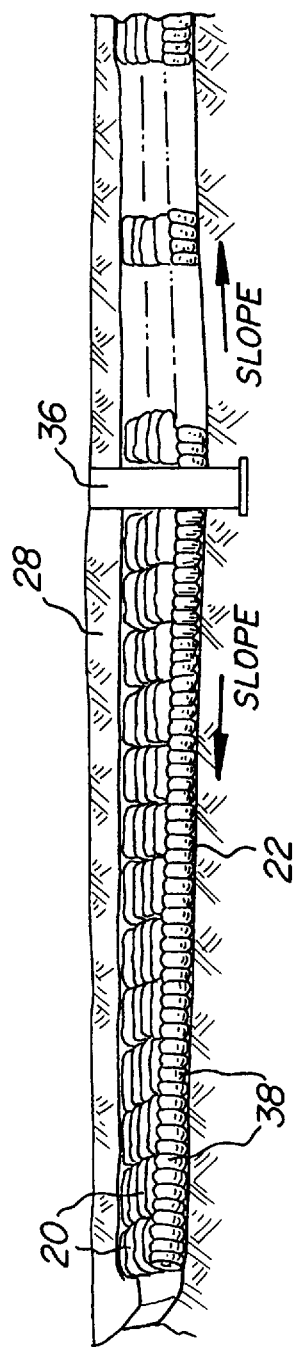
FIG. 4b is a view taken along line 4b–4b of FIG. 3 showing the water drainage and collection system of the present invention.

The water collecting means is described with reference to FIGS. 2 and 4a–4b. Preferably, the collection means comprises a series of culverts 38 that run along the bottom series of bales 20 and direct water toward a cavity, trench, catch basin, or other suitable reservoir 18. The culverts 38 are preferably formed from a plurality of large truck tires or off road terrain (ORT) tires that are positioned adjacent one another to form a flow channel toward the reservoir 18. In this way, the system increases its capacity to dispose of used tires. Alternatively, drainage piping of the variety known in the art may be used.

In application, rain water or water injected from an irrigation system flows over the vegetation growing in the soil cover 28. Chemicals, such as herbicides, fungicides and insecticides, previously placed over the vegetation are carried with the water. The water flows through the soil 28, the pervious membrane 26, and percolates through the tire bales. Because of the internal cavities in and between the tire bales 20, the water will slowly percolate through the bales 20 down to the liner 22. In this way, the bales serve as a temporary water storage and management mechanism. Because the liner 22 lies on a graded surface (note FIG. 3), the water will flow toward the reservoir 18. If culverts 38 are utilized in the system, water will flow through culverts toward the reservoir 18.

Figure 5:
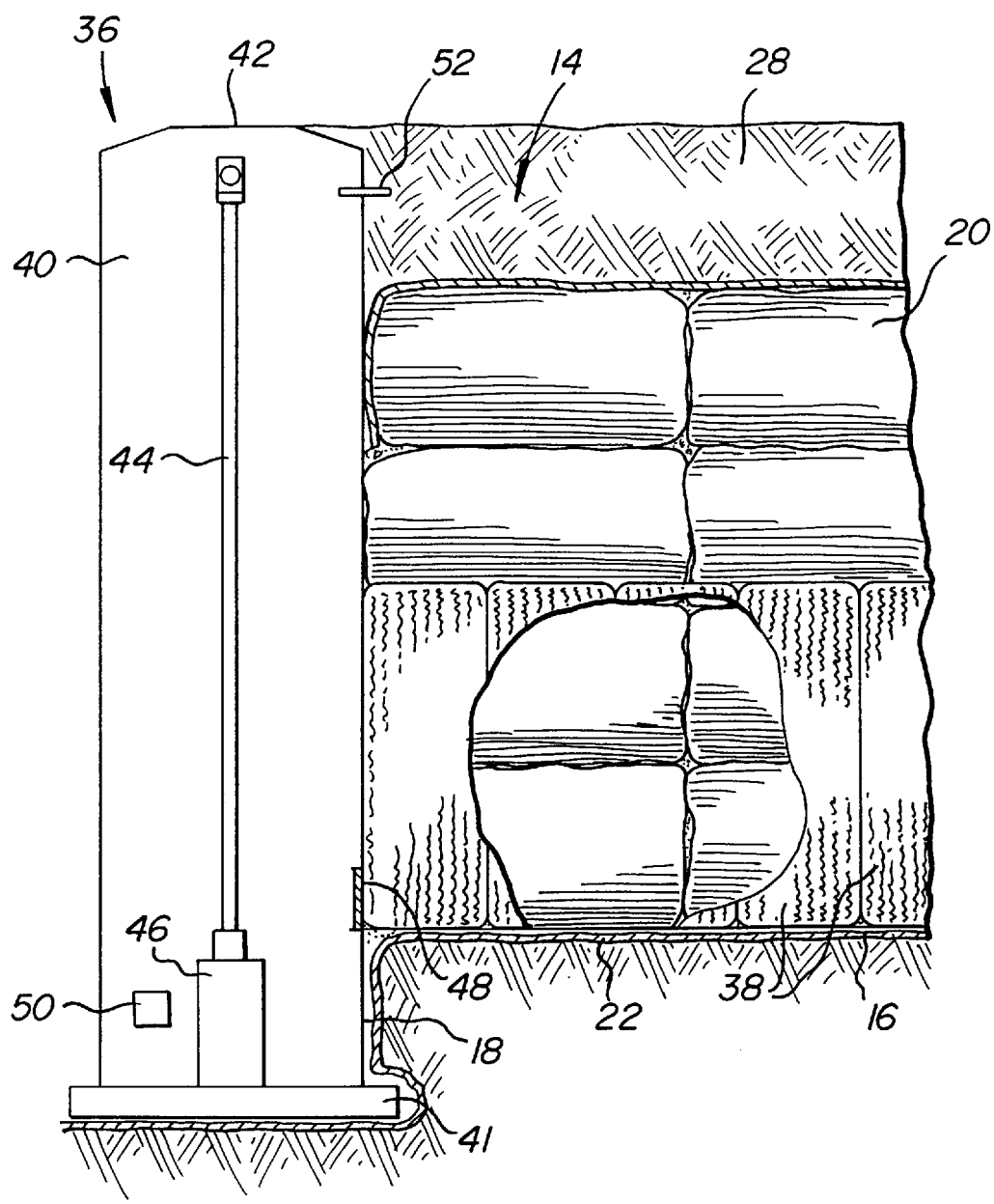
FIG. 5 is a side view showing the pumping station of the water drainage and collection system of the present invention.

The water within the system flows into the collection reservoir 18 at a low point in the system. A pumping station 36 is located at this low point in the system to extract water from the system as necessary. Referring now to FIG. 5, there is shown a pumping station 36 of the invention. The station includes a large diameter concrete pipe 40 (e.g. 36 inch) having a manhole cover 42 for entry into the station 36 as needed. The pipe 40 is positioned on a concrete base 41. A sump pump 46 is placed on the base 41 and moves water through the pipe 44 toward an outlet and onto an irrigation system. Water enters the reservoir 18 from the tire culvert 38 through a drain 48. If no culvert is present in the system, the water will flow directly from the tires bales 20 through the drain 48. Temperature and/or humidity gages 50 and 52 are positioned as shown to ascertain operational data. In larger systems, the water is preferably pumped from the reservoir 18 toward a holding pond (not shown) that cooperates with an irrigation system to recirculate the water back to the surface vegetation. In smaller systems, a separate holding pond would not be necessary and the water could be pumped directly from the reservoir 18 back to the surface vegetation. The system may also incorporate a water monitoring and treatment facility to monitor water quality and to treat the water to reduce contaminates.

The novel subsurface water drainage and collection system 12 of the present invention provides for numerous advantages over prior art systems. The use of tire bales 20 permits massive quantities of water to be stored in the system that can be removed for irrigation purposes as needed. The use of bales 20 is a vast improvement over the conventional use of stone because there is virtually no limit to the size of the available storage volume in the channel 14. Specifically, because gravel is often one of the most expensive components in the prior art drainage systems, significant water storage can not be economically obtained in these prior art systems. Moreover, the liner 22 provides for a closed system and prevents any treatment chemicals from entering ground water and permits recycling of the chemicals. Of course, the system of the present solves the tire disposal problems by providing a useful application for scrap tires. For example, in a simple par three hole having a channel 14 under the fairway 160 yards long, 30 yards in width, and 3.3 yards deep (or 15,840 cubic yards), approximately 6,887 tire bales 20 (each 2.3 cubic yards), or 688,700 tires (assuming 100 tires per bale), can be disposed in the system.

Referring now to FIG. 6, there is shown an alternative configuration for the bale placements about the reservoir. In this embodiment, tire bales 20 are used to form the reservoir 18 and are placed over the liner 22. The adjacent bales 20 that are positioned in the channel 14 are staggered and the water percolates through the tire bales 20 directly into the reservoir 7 as shown. In this configuration, the reservoir is above ground and can serve as an obstacle in a golf course 10 or otherwise serve as an aesthetic body of water.

Figure 7:
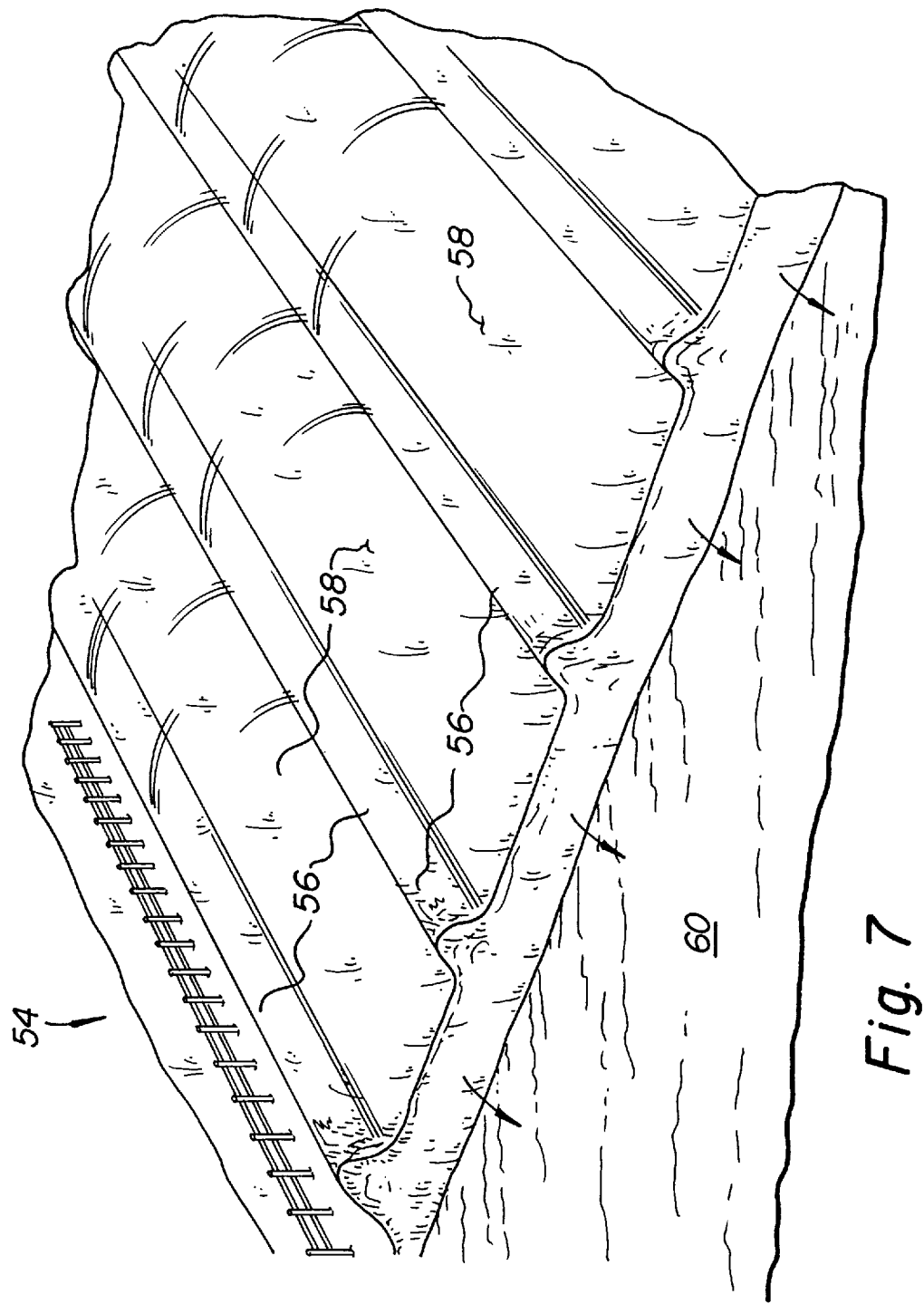
FIG. 7 shows a farm field employing a water drainage and collection system of the present invention.

Referring now to FIGS. 7 and 8, there is shown (like numeral indicating like parts) a farm crop field 54 incorporating the water drainage and collection system of the present invention. The field 54 has a series of ridges 56 and valleys 58 in which crops are grown. An irrigation system 62 supplies water to the crops and may incorporate a water holding pond 60 as known in the art. The system includes a liner 22 and a plurality of staggered tire bales 20. The configuration shown in FIG. 8 demonstrates how the tire bales function not only to percolate and store water as a part of the drainage and collection system, but may also serve as fill and to facilitate the surface landscape design. The liner 22 is wrapped around the sides of the tire bales 20 in order to prevent the burms or ridges 56 from washing out.

The method of constructing an improved water drainage and collection system is now described with reference to FIGS. 2 and 4a–4b. The first step in the construction process is to excavate a channel 14 having dimensions that depend on the application of the system and the number of tires available for disposal. Alternatively, an above ground channel can be formed using the tires as fill and for grading (note FIG. 8). The channel is graded to create a floor 16 the slopes toward an excavated collection reservoir 18. A liner 22 is then placed along the surfaces of the channel 14. For larger channels, many commercially available liner may be bonded together by an adhesive or the like to create a single contiguous liner 22. The liner 22 is anchored in position by forming anchor trenches 24 positioned about the perimeter of the channel. A pumping station 36 is constructed at the low points within the channel 14 in conjunction with the reservoirs 18. A plurality of tire components, preferably bales 20, are next introduced into the channel 14 and on top of the liner 22. The tire bales 20 may be positioned in a series of column and rows or in a staggered fashion. A fill material 32 is next placed in between any gaps formed in the collection of tire bales. A water pervious liner 26 is placed over the tire bales and appropriately secured. A soil cover 28 is next placed over the pervious liner 26 and graded as desired. An irrigation system including appropriate piping, holding pond, and sprinkler heads is constructed to cooperate with the water drainage and collection system of the present invention.

SUMMARY OF MAJOR ADVANTAGES OF THE INVENTION

After reading and understanding the foregoing detailed description of water drainage and collection system and method of construction thereof in accordance with preferred embodiments of the invention, it will be appreciated that several distinct advantages of the subject system and method are obtained.

Without attempting to set forth all of the desirable features of the instant water drainage and collection system and method of construction thereof, at least some of the major advantages include providing a channel 14 graded to insure water flow toward at least one reservoir 18 formed within the channel 14. A water impervious liner 22 secured within the channel 14 operates to prevent any water entering the system from filtering into adjacent ground water. A plurality of scrap tire components, preferably tire bales 20, are positioned within the channel 14 and over the liner 22 to provide a superior water percolation and storage means. The bales 20 also provide for cost effective sub-grade fill and means for improving topography contours of a golf course or the like. Of course, a principal advantage of the subject invention is to provide a means for useful large scale underground disposal of tires. A pumping station(s) 36 cooperates with an irrigation system to recycle the water and chemicals back to the surface of the golf course or the like.

In describing the invention, reference has been made to a preferred embodiment and illustrative advantages of the invention. Those skilled in the art, however, and familiar with the instant disclosure of the subject invention, may recognize additions, deletions, modifications, substitutions and other changes which fall within the purview of the subject invention.

What is claimed:
1. A water drainage and collection system comprising:
    a channel having a bottom and side wall surfaces;
    a water impervious liner positioned adjacent the bottom and side wall surfaces of said channel;
    a plurality of scrap tire components positioned within said channel and over said water impervious liner, each of said scrap tire components of said plurality of scrap tire components comprising a bale composed of approximately 90 to 105 scrap tires;
    a water pervious membrane positioned adjacent and above said plurality of scrap tire components; and
    a layer of earth positioned adjacent and above said water pervious membrane,
    whereby rain and irrigation water can flow through said layer of earth and water pervious membrane, percolate through said plurality of scrap tire components, and flow over said liner toward a low collection point within said channel.
2. A water drainage and collection system as defined in claim 1 wherein:
    each bale is approximately 2.5 feet by 4 feet by 5 feet in dimension.
3. A water drainage and collection system as defined in claim 1 further comprising:
    at least one collection reservoir formed at a low point in said channel, said liner being positioned above and adjacent said reservoir; and
    at least one pumping station associated with said at least one collection reservoir for removing water from said reservoir.
4. A water drainage and collection system as defined in claim 3 further comprising:
    at least one drainage culvert formed along the bottom wall of said channel and running a length of said channel, said at least one drainage culvert terminating at a corresponding said at least one reservoir.

5. A water drainage and collection system as defined in claim 4 wherein:

said at least one drainage culvert is formed from a plurality of tires positioned in a side-by-side relationship providing for a center water passage.

6. A water drainage and collection system as defined in claim 1 wherein:

each of said scrap tire components of said plurality of scrap tire components comprise whole scrap tires.

7. A water drainage and collection system as defined in claim 1 wherein:

each of said scrap tire components of said plurality of scrap tire components comprise 95% scrap tire and 5% void.

8. A water drainage and collection system comprising:

a channel having a bottom and side wall surfaces;

a water impervious liner positioned adjacent the bottom and side wall surfaces of said channel;

a plurality of scrap tire components positioned within said channel and over said water impervious liner, each of said scrap tire components of said plurality of scrap tire components comprising a bale composed of approximately 50 whole scrap tires;

a water pervious membrane positioned adjacent and above said plurality of scrap tire components; and a layer of earth positioned adjacent and above said water pervious membrane, whereby rain and irrigation water can flow through said layer of earth and water pervious membrane, percolate through said plurality of scrap tire components, and flow over said liner toward a low collection point within said channel.

9. A water drainage and collection system as defined in claim 8 wherein:

each bale is approximately 2.5 feet by 4 feet by 5 feet in dimension.

10. A golf course fairway comprising a surface layer of soil and grass with an associated irrigation system and a subsurface water drainage and collection system, said subsurface water drainage and collection system comprising:

a channel formed beneath said surface layer of soil and grass and having bottom and side wall surfaces;

a water impervious liner positioned adjacent the bottom and side wall surfaces of said channel;

a plurality of scrap tire components positioned within said channel and over said water impervious liner, each of said scrap tire components of said plurality of scrap tire components comprising a bale composed of approximately 90 to 105 scrap tires;

a water pervious membrane positioned adjacent and above said plurality of scrap tire components; and a layer of earth positioned adjacent and above said water pervious membrane, whereby rain and irrigation water can flow through said surface layer of soil and grass and the water pervious membrane, percolate through said plurality of scrap tire components, and flow over said liner toward a low collection point within said channel.

11. A golf course fairway as defined in claim 10 wherein said subsurface water drainage and collection system further comprises:

at least one collection reservoir formed at a low point in said channel, said liner being positioned above and adjacent said reservoir; and at least one pumping station associated with said at least one collection reservoir for removing water from said reservoir and delivering said water to the golf course irrigation system.

12. A golf course fairway as defined in claim 10 wherein said channel of said subsurface water drainage and collection system further comprises:

a grade along an x-axis and a z-axis of said bottom of said channel;

said grade being approximately 1% to 2% along the x-axis and approximately 3% along the z-axis.

13. A golf course fairway as defined in claim 10 wherein said channel of said subsurface water drainage and collection system further comprises:

a grade along an x-axis of said bottom of said channel;

said grade being configured with approximately a 12 inch drop over a 100 feet length along the x-axis.

14. A method of constructing a water drainage and collection system comprising the steps of:

excavating a channel having a bottom and side wall surfaces;

positioning a water impervious liner adjacent the bottom and side wall surfaces of said channel;

positioning a plurality of scrap tire components within said channel and over said water impervious liner, each of said scrap tire components of said plurality of scrap tire components comprising a bale composed of approximately 90 to 105 scrap tires;

positioning a water pervious membrane adjacent and above said plurality of scrap tire components; and positioning a layer of earth adjacent and above said water pervious membrane, such that rain and irrigation water can flow through said layer of earth and water pervious membrane, percolate through said plurality of scrap tire components, and flow over said liner toward a low collection point within said channel.

* * * * *